United States Patent
Miyata et al.

(10) Patent No.: US 8,571,780 B2
(45) Date of Patent: Oct. 29, 2013

(54) ENGINE CONTROLLING APPARATUS

(75) Inventors: Toshiyuki Miyata, Okazaki (JP); Katsunori Ueda, Okazaki (JP); Hitoshi Toda, Okazaki (JP); Koji Shibata, Okazaki (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 203 days.

(21) Appl. No.: 13/070,685

(22) Filed: Mar. 24, 2011

(65) Prior Publication Data

US 2012/0083988 A1    Apr. 5, 2012

(30) Foreign Application Priority Data

Oct. 1, 2010    (JP) .................................. 2010-224013

(51) Int. Cl.
*G06F 19/00* (2011.01)
(52) U.S. Cl.
USPC .............................. 701/99; 701/101; 701/103
(58) Field of Classification Search
None
See application file for complete search history.

(56) References Cited

U.S. PATENT DOCUMENTS

| | | | |
|---|---|---|---|
| 6,155,230 A | 12/2000 | Iwano et al. | |
| 6,278,915 B1 * | 8/2001 | Deguchi et al. | 701/22 |
| 6,829,528 B1 * | 12/2004 | Kang et al. | 701/51 |
| 7,143,741 B2 | 12/2006 | Yagi | |
| 8,209,106 B2 | 6/2012 | Ohtsuka et al. | |
| 2005/0109318 A1 * | 5/2005 | Ichihara et al. | 123/406.45 |
| 2006/0102143 A1 | 5/2006 | Yagi | |
| 2010/0198485 A1 | 8/2010 | Ohtsuka et al. | |

FOREIGN PATENT DOCUMENTS

| | | |
|---|---|---|
| EP | 2 180 169 A1 | 4/2010 |
| JP | 2-115545 A | 4/1990 |
| JP | 3627464 B2 | 3/2005 |
| JP | 2006-138300 A | 6/2006 |
| JP | 2009-68430 A | 4/2009 |
| JP | 2010-1794 A | 1/2010 |
| JP | 2010-1796 A | 1/2010 |

OTHER PUBLICATIONS

European Search Report issued in European Patent Application No. 11159796.9 on Apr. 26, 2013.
Japanese Office Action issued in Japanese Patent Application No. 2010-224013 on Mar. 5, 2013 and correpsonding English translation.

* cited by examiner

*Primary Examiner* — Thomas Tarcza
*Assistant Examiner* — Garrett Evans
(74) *Attorney, Agent, or Firm* — Birch, Stewart, Kolasch & Birch, LLP

(57) ABSTRACT

An engine controlling apparatus includes an engine speed detection unit that detects an engine speed, and an acceleration operation amount detection unit that detects an acceleration operation amount inputted to an acceleration pedal.
The apparatus includes a first calculation unit that calculates an acceleration demand torque based on the engine speed and the acceleration operation amount, a second calculation unit that calculates an external demand torque demanded from an external controlling system, and a third calculation unit that calculates a first target torque and a second target torque based on the acceleration demand torque and the external demand torque.
The apparatus includes a fourth calculation unit that calculates a maximum torque which can be generated by the engine at an actual charging efficiency, and a control unit that controls an ignition timing of the engine based on the actual torque and the first target torque.

7 Claims, 5 Drawing Sheets

ENGINE CONTROLLING APPARATUS

CROSS-REFERENCE TO THE RELATED APPLICATION

This application incorporates by references the subject matter of Application No. 2010-224013 filed in Japan on Oct. 1, 2010 on which a priority claim is based under 35 U.S.C. §119(a).

BACKGROUND OF THE INVENTION

1. Field of the Invention

The present invention is related to a controlling apparatus for controlling an engine mounted on a vehicle.

2. Description of the Related Art

As one of controlling methods for an engine mounted on a vehicle, torque-based (torque demand) control for controlling the intake air amount, fuel injection amount, ignition timing and so forth with reference to the magnitude of a torque demanded to an engine is available. In the torque-based control, the engine is controlled such that, for example, a target value for an engine torque is calculated based on the acceleration opening, engine speed and so forth and a torque having the target value is acquired. Further, in a vehicle in which an external controlling system such as an automatic transmission, an automatic cruise apparatus or a vehicle stabilization apparatus is mounted, output power demands from the several external controlling systems to the engine are converted into torques and unified by an engine ECU (engine electric controlling unit) and then a torque behavior of the engine is comprehensively controlled.

Conventionally, in the torque-based control, a controlling method is known wherein both of two kinds of controls whose responsibilities to a controlling operation are different from each other, that is, low-response torque control and high-response torque control, are carried out. In the low-response torque control of the former, the torque is controlled, for example, by an intake air amount operation represented by an operation of an electronically controlled throttle. On the other hand, in the high-response torque control of the latter, the torque is controlled, for example, by an ignition timing operation or a fuel injection amount operation. Since not only the responsibilities but also the adjustment widths of the torque are different from each other in the controls, the controls are suitably carried out in response to a running state of the vehicle or an operation state of the engine or the operation amounts by the controls are adjusted cooperatively.

Regarding the torque-based control, Japanese Patent No. 3627464 discloses an engine controlling apparatus wherein a low-response demand torque to be generated in a low-response controlling target and a high-response demand torque to cope with a high-response controlling target are calculated such that an excessive or deficient amount of the former torque is compensated for by the latter torque. In the technique, an intention of the driver of the vehicle, vehicle stability, a driving performance and so forth are satisfied, for example, by compensating for the torque deficiency by a response delay (lag) of an air amount operation by an operation of the fuel injection amount or ignition timing.

In such conventional torque-based control as disclosed in Japanese Patent No. 3627464 mentioned above, high-response torque control is carried out after a torque corresponding to an air response delay of the low-response torque control is estimated. In particular, the high-response demand torque is calculated based on the low-response demand torque estimated and calculated in the low-response torque control. Accordingly, there is a subject that it is difficult to enhance the calculation accuracy of a high-response demand torque unless the calculation accuracy of the low-response demand torque is secured. However, since the low-response demand torque is calculated based on a driver demand torque and an external demand torque and the actual torque is not taken into consideration, there is a limitation to assurance of calculation accuracy.

SUMMARY OF THE INVENTION

The present invention has been made in view of such subjects as described above, and it is an object of the present invention to enhance the accuracy in calculation of a torque for torque-based control with a simple configuration and implement a torque behavior of an engine in response to a demand torque with a high degree of accuracy.

It is to be noted that, in addition to the object described above, also it shall be understood as an object of the present invention to achieve such working effects as are provided by the constitutions of several modes for carrying out the present invention hereinafter described but are not provided by the conventional techniques.

An engine controlling apparatus disclosed herein includes an engine speed detection unit that detects an engine speed of an engine mounted on a vehicle, and an acceleration operation amount detection unit that detects an acceleration operation amount inputted to an acceleration pedal of the vehicle.

The engine controlling apparatus further includes a first calculation unit that calculates an acceleration demand torque based on the engine speed detected by the engine speed detection unit and the acceleration operation amount detected by the acceleration operation amount detection unit, a second calculation unit that calculates an external demand torque demanded from an external controlling system, and a third calculation unit that calculates a first target torque for ignition timing control and a second target torque for intake air amount control based on the acceleration demand torque and the external demand torque.

The engine controlling apparatus further includes a fourth calculation unit that calculates, as an actual torque, a maximum torque which can be generated by the engine at an actual charging efficiency, and a control unit that controls an ignition timing of the engine based on the actual torque and the first target torque.

This engine controlling apparatus is, for example, an engine ECU which controls the engine, and the external controlling system is a controlling apparatus other than the engine ECU. As an example of the external controlling system, an automatic transmission (for example, a CVT: Continuously Variable Transmission, or an ESC (Electronic Stability Controller)), an auto cruise controlling apparatus, an ECU for an auxiliary machine and so forth are available.

With the engine controlling apparatus disclosed herein, the calculation accuracy of a torque can be enhanced by controlling the ignition timing of the engine based on the actual torque and the first target torque.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE INVENTION

In the following, an embodiment of an engine controlling apparatus is described with reference to the drawings. It is to be noted that the embodiment described below is illustrative to the end, and there is no intention to eliminate various modifications and applications of the technique not specified in the embodiment described below.

1. Apparatus Configuration

Figure 1:
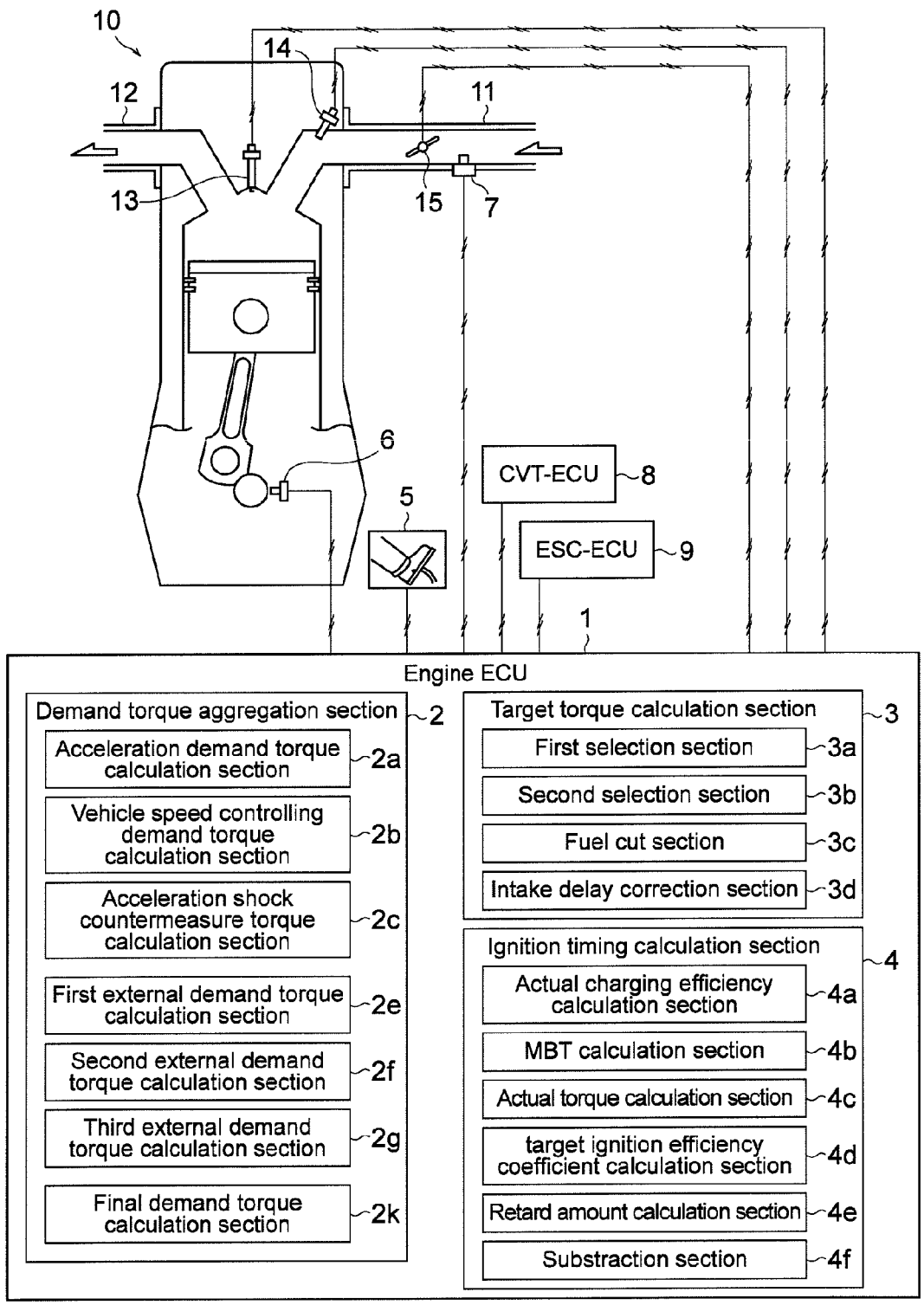
FIG. 1 is a block diagram illustrating an engine controlling apparatus according to an embodiment of the present invention.

A controlling apparatus of the present embodiment is applied to a vehicle-carried engine 10 shown in FIG. 1. Here, one cylinder from among a plurality of cylinders provided in the multi-cylinder four-cycle type engine 10 is shown. An ignition plug 13 is provided at the top of the cylinder in a state in which an end of the plug 13 is projected to the combustion chamber side. Further, an intake path 11 and an exhaust path 12 are connected to the top face of the cylinder head side of the combustion chamber.

An injector 14, an ETV (Electric Throttle Valve) 15 and an air flow sensor (intake air amount detection unit, AFS, Air Flow Sensor) 7 are provided on the intake path 11 side. The injector 14 injects fuel into the intake path 11, and the ETV 15 is an electronically controlled type throttle valve for changing an opening thereof to change an amount of intake air to be introduced into the cylinder. Further, the air flow sensor 7 is a sensor for detecting an amount of air (intake air amount) introduced into the engine, and an intake air flow rate Q which passes the ETV 15 is detected here.

A crank angle sensor 6 for detecting an angle $\theta_{CR}$ of a crankshaft is provided in the engine 10. The angle $\theta_{CR}$ of the crankshaft detected by the crank angle sensor 6 and the intake air flow rate Q detected by the air flow sensor 7 are transmitted to an engine ECU 1 (control unit) hereinafter described. It is to be noted that an engine speed Ne of the engine 10 can be grasped from a variation amount of the angle $\theta_{CR}$ per unit time. Accordingly, the crank angle sensor 6 has a function as a unit for detecting the engine speed Ne of the engine 10. A configuration may be applied wherein the engine speed Ne is calculated by the engine ECU 1 based on the angle $\theta_{CR}$ of the crankshaft detected by the crank angle sensor 6, or another configuration may be applied wherein the engine speed Ne is calculated in the inside of the crank angle sensor 6.

An acceleration pedal sensor 5 (APS, Acceleration pedal Position Sensor) for detecting an operation amount $\theta_{AC}$ of an acceleration pedal not shown is provided at an arbitrary position of the vehicle on which the engine 10 is mounted. A treadling operation amount $\theta_{AC}$ of the acceleration pedal is a parameter corresponding to an acceleration demand from the driver, or in other words, the treadling operation amount $\theta_{AC}$ is a parameter correlating to a load to the engine 10. Here, for example, the operation amount $\theta_{AC}$ corresponding to a treadling amount of the acceleration pedal by the driver is detected and the detected information is transmitted to the engine ECU 1.

Further, as electronically controlled apparatus, the engine ECU 1, a CVT-ECU 8 and an ESC-ECU 9 are provided in the vehicle. The electronically controlled apparatuses are LSI devices in which, for example, a microprocessor, a ROM, a RAM and so forth are integrated and are connected to each other through a communication line.

The CVT-ECU 8 controls working of a CVT apparatus (continuous speed variation apparatus) not shown and mounted on the vehicle, and the ESC-ECU 9 carries out control for adjusting output power of the engine 10 and braking force and driving force to individual wheels to stabilize the posture of the vehicle. It is to be noted that a working state of the CVT apparatus and the posture of the vehicle can change irrespective of the operation state of the engine 10. Therefore, the CVT-ECU 8 calculates the magnitude of the torque demanded from the CVT apparatus to the engine 10 at any time and transmits the calculated magnitude of the torque to the engine ECU 1. Similarly, the ESC-ECU 9 calculates the magnitude of the torque necessary for the stabilization of the vehicle posture at any time and transmits the calculated magnitude of the torque to the engine ECU 1.

Here, the electronically controlled apparatuses (here, the CVT-ECU 8 and the ESC-ECU 9) other than the engine ECU 1 are hereinafter referred to sometimes as external controlling systems. As an external controlling system other than the CVT-ECU 8 and the ESC-ECU 9, an automatic transmission controlling apparatus, an auxiliary engine ECU and so forth are available. Further, the torque demanded from an external controlling system to the engine 10 is hereinafter referred to as external demand torque. The external demand torque may be transmitted to the engine ECU 1 after it is calculated by an individual external controlling system such as the CVT-ECU 8 or the ESC-ECU 9, or the external demand torque may be calculated by the engine ECU 1 based on information collected by the individual external controlling systems.

The engine ECU 1 has a function (torque-based control) for comprehensively deciding, taking various systems such as an ignition system, a fuel system, an intake and exhaust system and a valve system regarding the engine 10 as controlling targets, torques demanded from the external controlling systems and a torque demanded from the driver to adjust the torque to be actually generated in the engine 10. The working of the ignition plug 13, injector 14 and ETV 15 described above is controlled by the engine ECU 1. As one of the controls to be carried out by the engine ECU 1, torque-based controls for controlling the intake air amount, fuel injection amount, ignition timing and so forth taking the magnitude of the torque demanded for the engine 10 as a reference are available.

Further, as controls other than the torque-based controls carried out by the engine ECU 1, for example, a cruise control (constant speed driving control), an idle feedback control and a fuel cut control are available. The cruise control is a control for adjusting the engine output power so that the running speed of the vehicle becomes constant without any operation by the driver, and is carried out, for example, when a constant speed driving switch not shown is operated by the driver.

The idle feedback control is a control for maintaining the engine speed Ne at an idle speed when a predetermined idle condition (for example, a condition regarding the engine speed Ne or the treadling operation amount $\theta_{AC}$ of the acceleration pedal) is satisfied, and is carried out by an idle feedback controlling section not shown in the engine ECU 1. Meanwhile, the fuel cut control is a control for stopping injection of fuel when a predetermined combustion cut condition (for example, a condition regarding the engine speed Ne or the treadling operation amount $\theta_{AC}$ of the acceleration pedal) is satisfied, and is carried out by a fuel cut controlling section not shown in the engine ECU 1.

The function of the engine ECU 1 is described below taking notice of the torque-based controls by the engine ECU 1.

2. Controlling Configuration

A demand torque aggregation section 2, a target torque calculation section 3 and an ignition timing calculation section 4 are provided in the engine ECU 1 (control unit). The demand torque aggregation section 2 aggregates torques demanded from the external controlling systems and a torque demanded from the driver to calculate two kinds of demand torques whose responsibilities to a controlling operation are different from each other. Here, an ignition controlling demand torque Pi_EXT_SA and an intake controlling demand torque Pi_EXT are calculated. The ignition control is a so-called high-response torque control, and the intake control is a so-called low-response torque control. The two kinds of the demand torques calculated here are transmitted to the target torque calculation section 3.

The target torque calculation section 3 calculates two kinds of target torques as controlling targets based on the two kinds of the demand torques calculated by the demand torque aggregation section 2. Here, an ignition controlling target torque Pi_TGT (first target torque) and an intake controlling target torque Pi_ETV_STD (second target torque) are calculated. The opening of the ETV 15 is controlled based on the intake controlling target torque Pi_ETV_STD calculated here. Further, the ignition controlling target torque Pi_TGT calculated here is transmitted to the ignition timing calculation section 4.

The ignition timing calculation section 4 calculates an execution ignition timing SA_ACT at which ignition is to be actually carried out based on the ignition controlling target torque Pi_TGT calculated by the target torque calculation section. The ignition plug 13 is controlled by the engine ECU 1 so that it ignites at the execution ignition timing SA_ACT.

It is to be noted that the functions of the demand torque aggregation section 2, target torque calculation section 3 and ignition timing calculation section 4 may be implemented by an electronic circuit (hardware) or may be programmed as software or else may be implemented such that some of the functions are provided as hardware while the other functions are provided as software.

2-1. Demand Torque Aggregation Section

Figure 2:
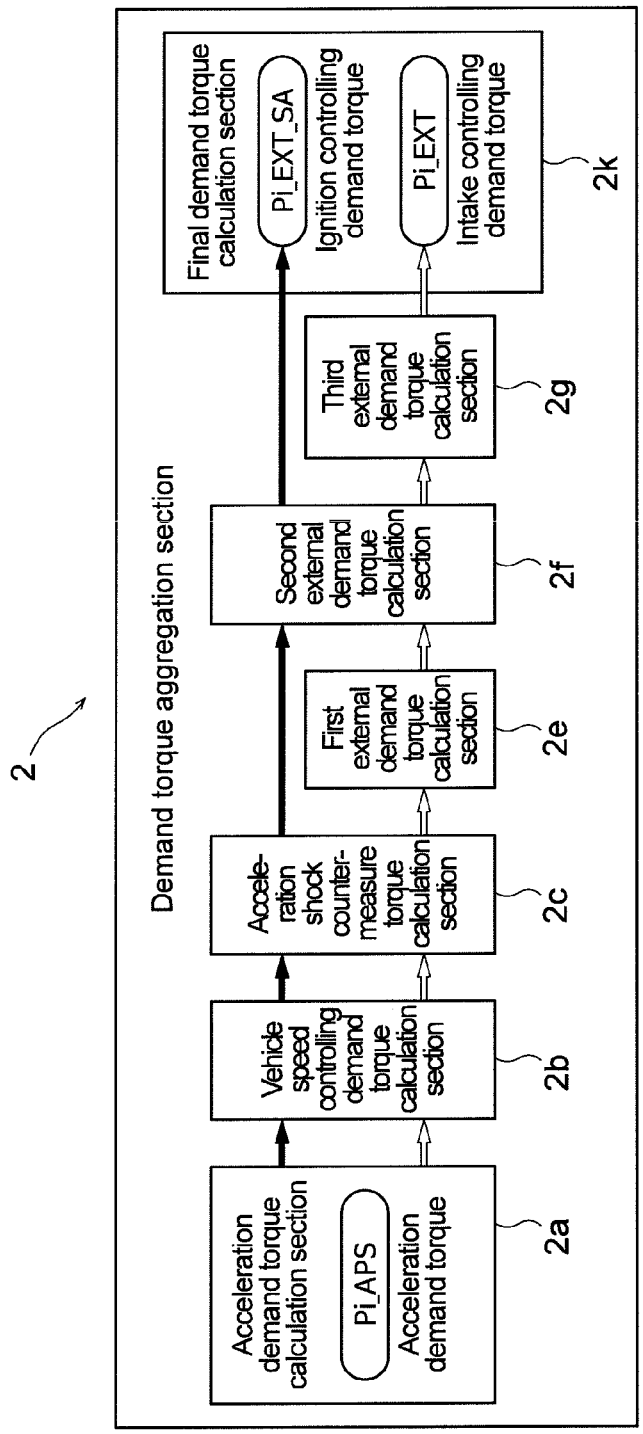
FIG. 2 is a process chart illustrating a controlling process by a demand torque aggregation section of the controlling apparatus.

A calculation process by the demand torque aggregation section 2 is illustrated in FIG. 2. The demand torque aggregation section 2 includes an acceleration demand torque calculation section 2a, a vehicle speed controlling demand torque calculation section 2b, an acceleration shock countermeasure torque calculation section 2c, three kinds of external demand torque calculation sections 2e, 2f and 2g, and a final demand torque calculation section 2k.

The acceleration demand torque calculation section 2a (first calculation unit) calculates an acceleration demand torque Pi_APS based on the engine speed Ne and the operation amount $\theta_{AC}$ of the acceleration pedal obtained based on the angle $\theta_{CR}$ of the crankshaft. It is to be noted that reference character Pi in FIG. 2 signifies an indicated mean effective pressure Pi, and the magnitude of the torque is represented here using the indicated mean effective pressure Pi. Not only the moment of a force generated by the engine 10 but also a torque equivalent (a pressure corresponding to a torque) represented by a mean effective pressure (for example, an indicated mean effective pressure Pi or a brake mean effective pressure Pe) acting upon the piston of the engine 10 are hereinafter referred to conveniently as torque.

In the demand torque aggregation section 2, two types of calculation processes are executed based on the acceleration demand torque Pi_APS calculated by the acceleration demand torque calculation section 2a. One of the processes is a process for calculating the ignition controlling demand torque Pi_EXT_SA as indicated by a black arrow mark in FIG. 2, and the other one of the processes is a process for calculating the intake controlling demand torque Pi_EXT as indicated by a solid-white arrow mark in FIG. 2. The ignition controlling demand torque Pi_EXT_SA and the intake controlling demand torque Pi_EXT are calculated independently of each other.

The vehicle speed controlling demand torque calculation section 2b principally carries out calculation for achieving arbitration between a torque demanded in the cruise control and the acceleration demand torque Pi_APS. Here, the value of the acceleration demand torque Pi_APS is corrected so that, for example, a variation width of the driving speed of the vehicle falls within a predetermined range and two types of torque values on which the demand in the cruise control is reflected are outputted. The two types of the torque values are transmitted to the acceleration shock countermeasure torque calculation section 2c. It is to be noted that only the calculation by the vehicle speed controlling demand torque calculation section 2b may be included at least in the process for calculating the intake controlling demand torque Pi_EXT, and the calculation by the vehicle speed controlling demand torque calculation section 2b may be skipped in the process for calculating the ignition controlling demand torque Pi_EXT_SA.

The acceleration shock countermeasure torque calculation section 2c carries out calculation for preventing a shock upon acceleration and deceleration of the vehicle. Here, for example, a limitation is applied to a fluctuation of the torque so that a torque shock does not occur, and the two types of the torque values on which the demand from the acceleration shock countermeasure is reflected are outputted. One of the two types of the torque values is transmitted to the first external demand torque calculation section 2e and the other one of the torque values is transmitted to the second external demand torque calculation section 2f.

Here, taking notice of the calculation process on the downstream side with respect to the acceleration shock countermeasure torque calculation section 2c, only the second external demand torque calculation section 2f is interposed in the calculation process for the ignition controlling demand torque having a high responsibility. On the other hand, the first external demand torque calculation section 2e, second external demand torque calculation section 2f and third external demand torque calculation section 2g are interposed in the calculation process for the intake controlling demand torque.

The first external demand torque calculation section 2e (one of the second calculation units) is a calculation section intervening only in the calculation process for the intake controlling torque for applying torque correction originating from the demand from the ESC-ECU 9. Here, the external demand torque demanded from the ESC-ECU 9 is inputted (or calculated), and correction is applied to the inputted torque value based on the external demand torque. For example, the torque demanded for stabilizing the posture of the vehicle is calculated as the external demand torque, and the inputted torque value is limited in accordance with the external demand torque. Then, a resulting torque value is transmitted to the second external demand torque calculation section 2f. The torque value outputted from the first external demand torque calculation section 2e is a torque value on which the demand from the ESC-ECU 9 is reflected.

The second external demand torque calculation section 2f (one of the second calculation units) calculates the external demand torque demanded from the CVT-ECU 8 and applies correction to the inputted torque value based on the calculated torque. For example, in the calculation process for the ignition controlling demand torque, a torque value demanded from the CVT apparatus is inputted (or calculated) as an external demand torque, and the torque value transmitted from the acceleration shock countermeasure torque calculation section 2c is limited in accordance with the external demand torque. Then, a resulting torque value is transmitted to the final demand torque calculation section 2k. Further, in the calculation process for the intake controlling demand torque, the torque value transmitted from the first external demand torque calculation section 2e is limited in accordance with the external demand torque from the CVT apparatus. Then, a resulting torque value is transmitted to the third external demand torque calculation section 2g. The torque value outputted from the second external demand torque calculation section 2f is a torque value on which the demand from the CVT-ECU 8 is reflected.

The third external demand torque calculation section 2g (one of the second calculation units) is a calculation section intervening only in the calculation process for the intake controlling torque for applying torque correction originating from a limitation of the upper limit value of the speed of the CVT apparatus. Here, the torque value inputted from the second external demand torque calculation section 2f is limited so that, for example, the speed of a pulley of the CVT apparatus does not exceed a predetermined upper limit value, and a resulting torque value is transmitted to the final demand torque calculation section 2k.

The final demand torque calculation section 2k calculates two types of the torque values as the ignition controlling demand torque Pi_EXT_SA and the intake controlling demand torque Pi_EXT. The demand torques are torques aggregated taking an intention of the driver of the vehicle, vehicle stability, a driving performance and so forth into consideration, and are transmitted to the target torque calculation section 3.

The final demand torque calculation section 2k (third calculation unit) calculates two types of the torque values as the ignition controlling demand torque Pi_EXT_SA and the intake controlling demand torque Pi_EXT. The demand torques are torques aggregated taking an intention of the driver of the vehicle, vehicle stability, a driving performance and so forth into consideration, and are transmitted to the target torque calculation section 3.

2-2. Target Torque Calculation Section

Figure 3:
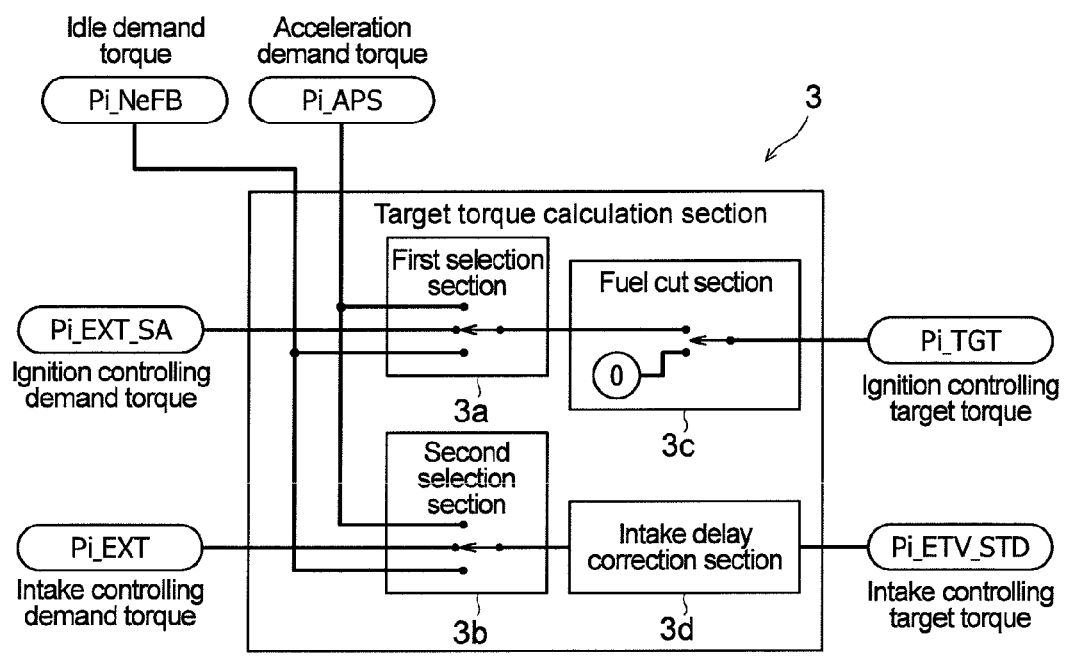
FIG. 3 is an example block diagram of a target torque calculation section of the controlling apparatus.

A calculation process by the target torque calculation section 3 is illustrated in FIG. 3. The acceleration demand torque Pi_APS calculated by the acceleration demand torque calculation section 2a, the ignition controlling demand torque Pi_EXT_SA and the intake controlling demand torque Pi_EXT calculated by the final demand torque calculation section 2k are inputted to the target torque calculation section 3. Further, an idle demand torque Pi_NeFB calculated by an idle feedback torque calculation section not shown in the engine ECU 1 is inputted. It is to be noted that the idle demand torque Pi_NeFB is a torque required for idle feedback control for maintaining the engine speed Ne at an idle speed.

The target torque calculation section 3 includes a first selection section 3a, a second selection section 3b, a fuel cut section 3c and an intake delay correction section 3d.

The first selection section 3a selects one of the ignition controlling demand torque Pi_EXT_SA, acceleration demand torque Pi_APS and idle demand torque Pi_NeFB as a target value of the torque for ignition control. Meanwhile, the second selection section 3b selects one of the intake controlling demand torque Pi_EXT, acceleration demand torque Pi_APS and idle demand torque Pi_NeFB as a target value of the torque for intake control.

As a selection condition of a target value of the torque by the first selection section 3a and the second selection section 3b, for example, presence/absence of a demand for a torque from an external controlling system, whether or not idling of the engine 10 is required, or the like may be used. The torque value selected by the first selection section 3a is transmitted to the fuel cut section 3c, and the torque value selected by the second selection section 3b is transmitted to the intake delay correction section 3d.

The fuel cut section 3c sets the ignition controlling target torque Pi_TGT to zero when fuel cut control is to be executed. The carrying out condition of the fuel cut control is decided at any time, for example, based on the engine speed Ne, operation amount $\theta_{AC}$ of the acceleration pedal, engine cooling water temperature and so forth by a fuel cut controlling section not shown. Further, when the fuel cut control is not carried out, the fuel cut section 3c calculates the torque value selected by the first selection section 3a as it is as the ignition controlling target torque Pi_TGT. The ignition controlling target torque Pi_TGT calculated here is transmitted to the ignition timing calculation section 4.

The intake delay correction section 3d carries out correction calculation in response to an intake delay from the ETV 15. Here, the intake controlling target torque Pi_ETV_STD is calculated as a torque value taking the intake delay into consideration based on the intake characteristics of the engine 10 and the ETV 15. It is to be noted that, as a particular correction calculation method by the intake delay correction section 3d, various methods are available using the intake controlling target torque Pi_ETV_STD calculated here in response to a controlling mode of the ETV 15. For example, a locus of a torque fluctuation desired to be implemented may be produced by carrying out a first-order delay calculation and a second-order delay calculation wherein an actual intake delay is simulated in response to the driving condition or the selected demand torque to the torque value selected by the second selection section 3b.

The engine ECU 1 carries out intake control for adjusting the opening of the ETV 15 based on the intake controlling target torque Pi_ETV_STD. On the other hand, ignition control is carried out after calculation is applied further to the ignition controlling target torque Pi_TGT by the ignition timing calculation section 4 hereinafter described.

2-3. Ignition Timing Calculation Section

Figure 4:
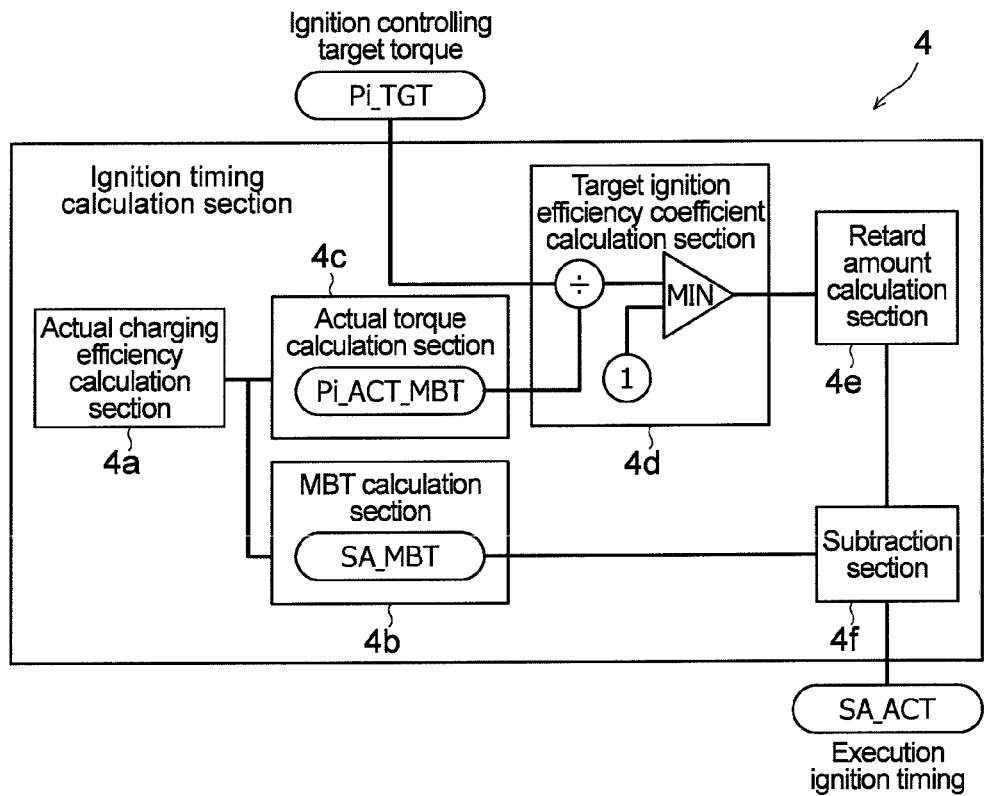
FIG. 4 is an example block diagram of an ignition timing calculation section of the controlling apparatus.

A calculation process by the ignition timing calculation section 4 is illustrated in FIG. 4. The ignition controlling target torque Pi_TGT calculated by the target torque calculation section 3, intake air flow rate Q detected by the air flow sensor 7 and engine speed Ne are inputted to the ignition timing calculation section 4. Further, the ignition timing calculation section 4 includes an actual charging efficiency calculation section 4a, an MBT calculation section 4b, an actual torque calculation section 4c, a target ignition efficiency coefficient calculation section 4d, a retard amount calculation section 4e and a subtraction section 4f.

The actual charging efficiency calculation section 4a (actual charging efficiency calculation unit) calculates an actual charging efficiency of the cylinder which is a controlling target as an actual charging efficiency Ec based on the inputted intake air flow rate Q. Here, an amount of air actually taken into the cylinder of the controlling target is calculated from the total of the intake air flow rate Q detected by the air flow sensor 7 within one immediately preceding intake stroke (one stroke within which the piston moves from the top dead center to the bottom dead center) regarding the cylinder of the controlling target to calculate the actual charging efficiency Ec. The actual charging efficiency Ec calculated here is transmitted to the MBT calculation section 4b and the actual torque calculation section 4c.

Figure 5:
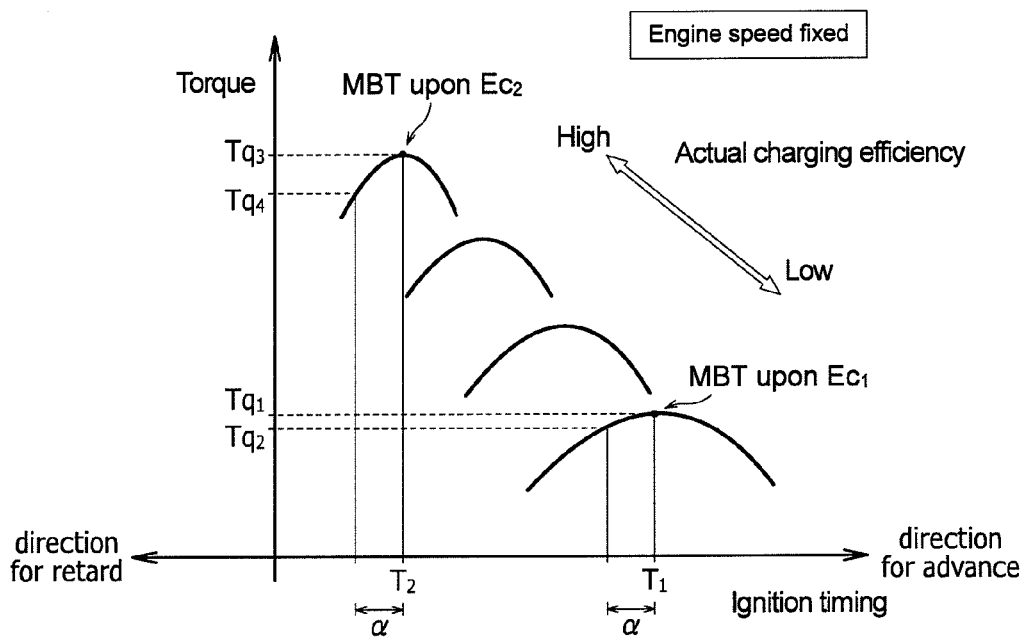
FIG. 5 is an example view of a correspondence map among an actual charging efficiency Ec, an ignition timing and a torque used in the controlling apparatus.

The MBT calculation section 4b calculates an ignition timing (MBT, Minimum spark advance for Best Torque) at which a maximum torque is generated as SA_MBT based on the actual charging efficiency Ec calculated by the actual charging efficiency calculation section 4a and the engine speed Ne. The MBT calculation section 4b stores a correspondence relationship among the actual charging efficiency Ec, ignition timing and torque generated with a theoretical air fuel ratio as a map for each engine speed Ne, for example, as illustrated in FIG. 5, and calculates the ignition timing SA_MBT using the correspondence relationship. In the graph of FIG. 5, the ignition timing SA_MBT when the actual charging efficiency Ec is equal to a first predetermined value $Ec_1$ is represented by $T_1$, and the ignition timing SA_MBT when the actual charging efficiency Ec is equal to a second predetermined value $Ec_2$ is represented by $T_2$. The ignition timing SA_MBT calculated here is transmitted to the subtraction section 4f.

The actual torque calculation section 4c (fourth calculation unit) calculates a maximum torque (that is, a torque generated in the case where the ignition timing is set to the MBT at the actual charging efficiency Ec) which can be generated by the cylinder of the controlling target as actual torque Pi_ACT_MBT in the actual charging efficiency Ec calculated by the actual charging efficiency calculation section 4a. The actual torque Pi_ACT_MBT here corresponds to a maximum value of a torque variation graph in the case of each actual charging efficiency Ec illustrated in FIG. 5.

The actual torque calculation section 4c calculates the actual torque Pi_ACT_MBT, for example, using such a map as described hereinabove stored in the MBT calculation section 4b. In the graph of FIG. 5, the actual torque Pi_ACT_MBT when the actual charging efficiency Ec is equal to the first predetermined value $Ec_1$ is represented by $T_{q1}$ and the actual torque Pi_ACT_MBT when the actual charging efficiency Ec is equal to the second predetermined value $Ec_2$ is represented by $Tq_3$. The actual torque Pi_ACT_MBT calculated here is transmitted to the target ignition efficiency coefficient calculation section 4d.

It is to be noted that, in the map of FIG. 5, the magnitude of the torque generated in the case where only the ignition timing is varied at the fixed actual charging efficiency Ec under the same combustion condition (for example, under a condition that the engine speed and the air fuel ratio are fixed) is graphed, and graphs at the actual charging efficiencies Ec different from each other are indicated in an overlapping state with each other. At the fixed actual charging efficiency Ec, the torque on the axis of ordinate forms an upward convex curve with respect to the variation of the ignition timing on the axis of abscissa. The ignition timing corresponding to a coordinate of the top of the graph is the MBT and the torque corresponding to the coordinate of the top is the actual torque Pi_ACT_MET. Further, if the actual charging efficiency Ec increases, then the combustion speed (fire propagation speed in the cylinder) increases in response to increase of the amount of air introduced in the cylinder and the MBT moves in the delaying direction.

The target ignition efficiency coefficient calculation section 4d calculates a ratio k [k=(Pi_TGT)/(Pi_ACT_MBT), a target ignition efficiency coefficient] between the ignition controlling target torque Pi_TGT calculated by the target torque calculation section 3 and the actual torque Pi_ACT_MBT calculated by the actual torque calculation section 4c. Here, it is calculated with what ratio degree the ignition controlling target torque Pi_TGT is necessary with respect to the magnitude of the torque which can be generated based on the intake air flow rate Q actually detected by the air flow sensor 7.

It is to be noted that, in the actual torque calculation section 4c of the present embodiment, the value of the ratio K is clipped within a range lower than 1 in order to prevent generation of such an excessively high torque as exceeds the actual torque Pi_ACT_MBT by the ignition control. The ratio K calculated here is transmitted to the retard amount calculation section 4e.

Figure 6:
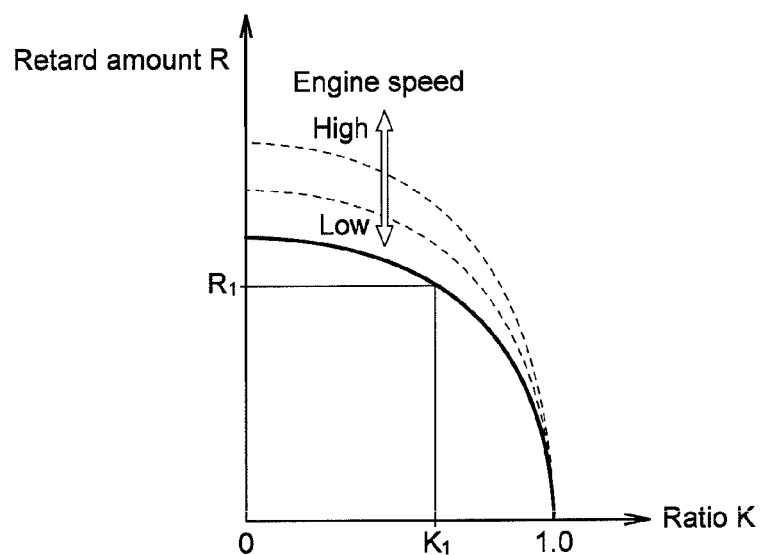
FIG. 6 is an example view of a correspondence map between a ratio k and a retard amount R used in the controlling apparatus.

The retard amount calculation section 4e (storage unit) calculates a retard amount R (delay angle amount of the ignition timing) of the magnitude corresponding to the ratio k with reference to the MBT. The retard amount calculation section 4e stores a correspondence relationship between the ratio K and the retard amount R as a map for each engine speed Ne, for example, as illustrated in FIG. 6, and calculates the retard amount R using the map. It is to be noted that the retard amount R here is calculated with reference to the MBT and has a characteristic that the retard amount R approaches zero as the ratio K ($0 \leq K \leq 1$) approaches 1. Further, the retard amount R has a characteristic that it increases as the engine speed Ne increases, for example, as indicated by a broken line in FIG. 6. In this instance, it is imaginable to apply a configuration that an ignition delay angle Ne correction coefficient is set in response to the engine speed Ne and the retard amount R obtained from the relationship indicated by a solid line graph in FIG. 6 is multiplied by the ignition delay angle Ne correction coefficient to calculate the final retard amount R.

Figure 7:
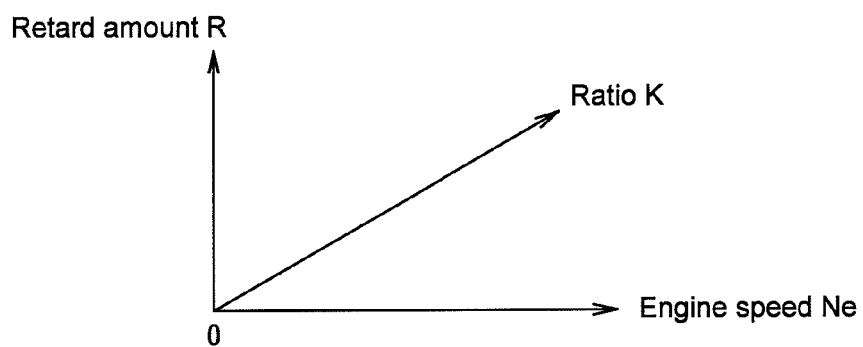
FIG. 7 is an example view of a correspondence map among a ratio k, a retard amount R and an engine speed used in the controlling apparatus.

Or, such a three-dimensional map as shown in FIG. 7 may be stored into the retard amount calculation section 4e (second storage unit) such that the retard amount R is calculated using the stored map. In the three-dimensional map of FIG. 7, a relationship among the ratio K, engine speed Ne and retard amount R obtained through an experimental trial, an experiment or the like is determined. In this instance, while the required storage capacity increases in comparison with that of the method which uses the ignition delay angle Ne correction coefficient, the calculation accuracy can be enhanced. The retard amount R calculated here is transmitted to the subtraction section 4f.

The subtraction section 4f calculates the execution ignition timing SA_ACT based on the retard amount R calculated by the retard amount calculation section 4e. Here, the retard amount R is subtracted, for example, from the ignition timing SA_MBT calculated by the MBT calculation section 4b to calculate the execution ignition timing SA_ACT. The execution ignition timing SA_ACT calculated here is an ignition timing for generating the torque corresponding to the ignition controlling target torque Pi_TGT.

The engine ECU 1 carries out the ignition control for causing the ignition plug 13 provided in the cylinder of the controlling target to ignite at the execution ignition timing SA_ACT.

3. Working, Effect

In the controlling apparatus for the engine 10 described above, the ignition timing of the ignition plug 13 is controlled not based only on the ignition controlling torque Pi_EXT_SA calculated by the final demand torque calculation section 2$k$, but is controlled based on the actual torque Pi_ACT_MBT calculated by the actual torque calculation section 4$c$ and the ignition controlling torque Pi_EXT_SA. In particular, the ignition control is carried out taking the magnitude of the torque actually generated in the engine 10 into consideration. Accordingly, the calculation accuracy of the torque can be enhanced and the torque behavior of the engine 10 in accordance with a demand can be implemented with a high degree of accuracy. Particularly, the behavior corresponding to the high-response demand torque from within the engine torque can be controlled accurately.

Further, since the engine ECU 1 described above calculates the ignition controlling target torque Pi_TGT and the intake controlling target torque Pi_ETV_STD independently of each other as seen in FIGS. 2 and 3, the controllability of a high-response demand torque does not depend upon the calculation method for the low-response demand torque. Accordingly, there is an advantage that the independence and the parallelism of the ignition control and the intake control can be secured.

Further, in the actual charging efficiency calculation section 4$a$ of the engine ECU 1 described above, the amount of air actually taken into the cylinder of the controlling target is calculated based on the intake air flow rate Q detected by the air flow sensor 7 upon one immediately preceding intake stroke to calculate the actual charging efficiency Ec. In particular, the value of the actual charging efficiency Ec obtained here is updated for each of combustion cycles of the engine 10 and is calculated as a value conforming to the actual intake state of the engine 10. In this manner, by calculating the actual charging efficiency Ec from the intake air flow rate Q detected by the air flow sensor 7, the actual torque Pi_ACT_MBT corresponding to the actual air amount can be accurately grasped by the actual torque calculation section 4$c$ and the control accuracy can be enhanced.

Further, the retard amount calculation section 4$e$ of the engine ECU 1 described above calculates the retard amount R based on the ratio K between the ignition controlling target torque Pi_TGT calculated by the target ignition efficiency coefficient calculation section 4$d$ and the actual torque Pi_ACT_MBT. For example, where the ratio K is K1 [where (Pi_TGT)=K1×(Pi_ACT_MBT)], the retard amount R1 corresponding to this is calculated as seen in FIG. 6.

On the other hand, the ratio of the torque obtained when the ignition timing is changed with the retard amount R1 with reference to the MBT with respect to the torque obtained when ignition is carried out at the MBT is fixed irrespective of the actual charging efficiency Ec. For example, as seen in FIG. 5, the ratio $(Tq_2)/(Tq_1)$ of a torque $Tq_2$ obtained when the ignition timing is retarded by a predetermined value α with respect to torque $Tq_1$ at the MBT where the actual charging efficiency Ec is equal to a first predetermined value $Ec_1$ coincides with a ratio $(Tq_4)/(Tq_3)$ of torque $Tq_4$ obtained when the ignition timing is retarded by the predetermined value α with respect to the torque $Tq_3$ at the MBT where the actual charging efficiency Ec is equal to a second predetermined value $Ec_2$.

Accordingly, by using the ratio K with respect to the torque (actual torque Pi_ACT_MBT) which can be generated in the case where ignition is carried out at the MBT, the ignition timing necessary for obtaining the ignition controlling target torque Pi_TGT calculated by the target torque calculation section 3 can be grasped accurately irrespective of the load (actual charging efficiency Ec) to the engine 10.

Further, since the correspondence relationship mapped in advance between the ratio K and the retard amount R is stored in the retard amount calculation section 4$e$ of the engine ECU 1 described above, there is an advantage that the ignition timing necessary for generating the ignition controlling target torque Pi_TGT can be calculated readily and the quick and accurate control can be anticipated, for example, even if time after the intake stroke to ignition is very short. Further, if such a correspondence relationship among the ratio K, engine speed Ne and retard amount R as illustrated, for example, in FIG. 7 is stored in advance in the retard amount calculation section 4$e$, then the ignition timing necessary for generating the ignition controlling target torque Pi_TGT can be accurately grasped.

4. Modifications, etc.

Irrespective of the embodiment specifically described above, variations and modifications can be made without departing from the scope of the present invention. The configurations of the present embodiment can be selected or omitted as occasion demands or may be suitably combined.

While, in the embodiment described above, the engine ECU 1 including the functions of the demand torque aggregation section 2, target torque calculation section 3 and ignition timing calculation section 4 is illustrated, a particular controlling configuration of the engine ECU 1 is not limited to this.

For example, it is imaginable to control the ignition timing of the engine 10 based on values corresponding to the actual torque Pi_ACT_MBT and the first target torque Pi_EXT_SA in an electronic controlling apparatus including a unit (first calculation unit) for calculating a value corresponding to the acceleration demand torque Pi_APS, a unit (second calculation unit) for calculating a value corresponding to the external demand torque, a unit (third calculation unit) for calculating values corresponding to the first target torque Pi_EXT_SA for the ignition timing control and the second target torque Pi_EXT for the intake air amount control and a unit (fourth calculation unit) for calculating a value corresponding to the actual torque Pi_ACT_MBT.

By controlling the ignition timing at least based on an actual value corresponding to the actual torque Pi_ACT_MBT, the technical effects described hereinabove are achieved. Accordingly, particular controlling configurations can be suitably added or simplified.

Further, while, in the embodiment described hereinabove, the actual charging efficiency calculation section 4$a$ for calculating the actual charging efficiency Ec based on the intake flow rate Q detected by the air flow sensor 7 is described as an example, the calculation technique of the actual charging efficiency Ec is not limited only to this. For example, the pressure and/or the temperature in the intake path 11 or the cylinder may be used to calculate the actual charging efficiency Ec, or the pressure, temperature and the intake flow rate Q may be used together to calculate a more accurate actual charging efficiency Ec. Further, while, in the embodiment described hereinabove, the actual charging efficiency calculation section 4$a$ calculating the actual charging efficiency Ec from the total of the intake flow rate Q detected by the air flow sensor 7 within a period of one immediately preceding intake stroke is described above as an example, the calculation method of the actual charging efficiency Ec is not limited to this.

For example, the width of time within which the intake flow rate Q is referred to may be changed, or a more accurate actual charging efficiency Ec may be calculated taking the intake flow rate Q or an exhaust flow rate over a plurality of intake strokes, an actual charging efficiency Ec calculated in the preceding calculation cycle, a history of the actual charging efficiency Ec or the like into consideration.

By enhancing the grasping accuracy and the likelihood of the amount of air actually introduced into the cylinder in this manner, more precise engine torque control can be achieved.

Further, while, in the embodiment described hereinabove, the retard amount R is calculated based on the ratio K between the ignition controlling target torque Pi_TGT and the actual torque Pi_ACT_MBT, instead of such calculation, the retard amount R may be calculated based on the difference between the ignition controlling target torque Pi_TGT and the actual torque Pi_ACT_MBT. If a calculation method which takes notice of a correlation between the degree of the difference between the ignition controlling target torque Pi_TGT and the actual torque Pi_ACT_MBT and the retard amount R is used, then it is possible to grasp an ignition timing necessary to generate the actual torque Pi_ACT_MBT and the technical effects described above can be achieved.

It is to be noted that the combustion type of the engine 10 in the embodiment described above can be set arbitrarily, and the present invention can be applied at least to general engines for which torque-based control is carried out and can be applied also to a lean burn engine, an engine having a variable valve lift mechanism and so forth.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

REFERENCE SIGNS LIST

1 Engine ECU (control unit)
2 Demand torque aggregation section
2a Acceleration demand torque calculation section (first calculation unit)
2b Vehicle speed controlling demand torque calculation section
2c Acceleration shock countermeasure torque calculation section
2e First external demand torque calculation section (second calculation unit)
2f Second external demand torque calculation section (second calculation unit)
2g Third external demand torque calculation section (second calculation unit)
2k Final demand torque calculation section
3 Target torque calculation section (third calculation unit)
3a First selection section
3b Second selection section
3c Fuel cut section
3d Intake delay correction section
4 Ignition timing calculation section
4a Actual charging efficiency calculation section (actual charging efficiency calculation unit)
4b MBT calculation section
4c Actual torque calculation section (fourth calculation unit)
4d Target ignition efficiency coefficient calculation section
4e Retard amount calculation section (storage unit)
4f Subtraction section
5 Acceleration pedal sensor
6 Crank angle sensor
7 Air flow sensor (intake air amount detection unit)
8 CVT-ECU
9 ESC-ECU
10 Engine

What is claimed is:

1. An engine controlling apparatus, comprising:
an engine speed detection unit that detects an engine speed of an engine mounted on a vehicle;
an acceleration operation amount detection unit that detects an acceleration operation amount inputted to an acceleration pedal of the vehicle;
a first calculation unit that calculates an acceleration demand torque based on the engine speed detected by said engine speed detection unit and the acceleration operation amount detected by said acceleration operation amount detection unit;
a second calculation unit that calculates an external demand torque, a first demand torque and a second demand torque, the external demand torque being demanded from an external controlling system, the first demand torque being for ignition timing control, the second demand torque being for intake air amount control, both the first demand torque and the second demand torque being calculated based on the acceleration demand torque and the external demand torque;
a third calculation unit that calculates a first target torque for ignition timing control and a second target torque for intake air amount control, the first target torque being calculated based on the first demand torque, the second target torque being calculated based on both the second demand torque and an air intake delay in an intake system of the engine;
a fourth calculation unit that calculates, as an actual torque, a maximum torque which can be generated by the engine at an actual charging efficiency; and
a control unit that controls an ignition timing of the engine based on the actual torque and the first target torque, wherein
said second calculation unit includes a first external demand torque calculation section and a second external demand torque calculation section, and
said second external demand torque calculation section applies correction to both the first demand torque and the second demand torque, and
said first external demand torque calculation section applies correction for stabilizing the posture of the vehicle only to the second demand torque.

2. The engine controlling apparatus according to claim 1, wherein
said control unit controls the ignition timing of the engine based on a ratio between the first target torque calculated by said third calculation unit and the actual torque calculated by said fourth calculation unit.

3. The engine controlling apparatus according to claim 2, wherein
said control unit includes a storage unit that stores a correspondence relationship between the ratio between the first target torque and the actual torque and a retard amount of the ignition timing of the engine.

4. The engine controlling apparatus according to claim 3, wherein
said control unit further includes a second storage unit that stores a correspondence relationship among the ratio, the retard amount and the engine speed detected by said engine speed detection unit.

5. The engine controlling apparatus according to claim 1, further comprising:
an intake controlling unit that controls an amount of intake air to be introduced into the engine; wherein
said first calculation unit carries out a first-order delay calculation taking a response delay of the intake into consideration for a value calculated based on the engine speed and the acceleration operation amount to calculate the acceleration demand torque.

6. The engine controlling apparatus according to claim 1, further comprising:
an intake air amount detection unit that detects an amount of intake air to be introduced into the engine; and
an actual charging efficiency calculation unit that calculates the actual charging efficiency based on the intake air amount detected by said intake air amount detection unit.

7. The engine controlling apparatus according to claim 1, wherein
the external controlling system includes an automatic transmission controlling apparatus, and
said second calculation unit calculates the external demand torque based on a torque value demanded from the automatic transmission controlling apparatus.

* * * * *